(12) United States Patent
Krishnan et al.

(10) Patent No.: US 10,839,798 B2
(45) Date of Patent: Nov. 17, 2020

(54) INTENT INTERPRETER FOR A VISUAL BOT BUILDER

(71) Applicant: salesforce.com, inc., San Francisco, CA (US)

(72) Inventors: Arvind Krishnan, San Francisco, CA (US); George Hu, San Francisco, CA (US); Benjamin Myles, Portland, OR (US); Jonathan Rico Morales, San Franciso, CA (US); Gregory A. Bennett, San Francisco, CA (US); Molly Mahar, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 131 days.

(21) Appl. No.: 15/884,002

(22) Filed: Jan. 30, 2018

(65) Prior Publication Data

US 2019/0138600 A1    May 9, 2019

Related U.S. Application Data

(60) Provisional application No. 62/581,550, filed on Nov. 3, 2017.

(51) Int. Cl.
| | |
|---|---|
| *G10L 15/22* | (2006.01) |
| *G06F 3/0484* | (2013.01) |
| *H04L 12/58* | (2006.01) |
| *G06F 3/0482* | (2013.01) |
| *G06Q 10/00* | (2012.01) |
| *G06F 40/30* | (2020.01) |
| *G06F 40/35* | (2020.01) |
| *G06F 40/232* | (2020.01) |
| *G06F 8/34* | (2018.01) |

(52) U.S. Cl.
CPC ............ *G10L 15/22* (2013.01); *G06F 3/0482* (2013.01); *G06F 3/0484* (2013.01); *G06F 8/34* (2013.01); *G06F 40/232* (2020.01); *G06F 40/30* (2020.01); *G06F 40/35* (2020.01); *G06Q 10/00* (2013.01); *H04L 51/02* (2013.01)

(58) Field of Classification Search
CPC ..................................................... G10L 15/22
See application file for complete search history.

(56) References Cited

U.S. PATENT DOCUMENTS

| | | | | |
|---|---|---|---|---|
| 7,881,440 | B2* | 2/2011 | Castillo | G06F 11/3604 |
| | | | | 379/112.08 |
| 9,961,191 | B1* | 5/2018 | DeMaio | H04M 3/242 |
| 10,025,567 | B2* | 7/2018 | Balasubramanian | ... H04L 51/02 |
| 2015/0350443 | A1* | 12/2015 | Kumar | G06Q 30/016 |
| | | | | 379/265.13 |
| 2017/0213157 | A1* | 7/2017 | Bugay | G06F 17/2785 |

(Continued)

*Primary Examiner* — Douglas Godbold
(74) *Attorney, Agent, or Firm* — Sterne, Kessler, Goldstein & Fox P.L.L.C.

(57) ABSTRACT

Disclosed herein are embodiments for a visual bot builder. An embodiment operates by receiving a selected dialog including one or more interactions between a chat bot and a recipient. A plurality phrases corresponding to triggering an execution of the selected dialog is received. The selected dialog is configured such that upon a receipt of one or more of the plurality of phrases, the chat bot executes the selected dialog. One of the plurality of phrases is received. The selected dialog is executed responsive to the received one of the plurality of phrases.

18 Claims, 14 Drawing Sheets

(56) References Cited

U.S. PATENT DOCUMENTS

| | | | |
|---|---|---|---|
| 2017/0279906 A1* | 9/2017 | Laird-Mcconnell | H04L 67/10 |
| 2017/0286269 A1* | 10/2017 | Furman | H04L 51/02 |
| 2017/0315714 A1* | 11/2017 | Shyamsundar | G06F 3/0482 |
| 2017/0344622 A1* | 11/2017 | Islam | G06Q 30/0625 |
| 2018/0054400 A1* | 2/2018 | Akopian | H04L 51/02 |
| 2018/0054523 A1* | 2/2018 | Zhang | H04M 3/5166 |
| 2018/0300311 A1* | 10/2018 | Krishnamurthy | G06F 17/274 |
| 2018/0308476 A1* | 10/2018 | Hirzel | G06F 17/271 |
| 2018/0358006 A1* | 12/2018 | McConnell | H04L 51/02 |
| 2018/0359198 A1* | 12/2018 | Eidem | G06F 3/167 |
| 2019/0042561 A1* | 2/2019 | Kakirwar | G06F 40/295 |
| 2019/0043106 A1* | 2/2019 | Talmor | G06Q 30/0617 |
| 2019/0124020 A1* | 4/2019 | Bobbarjung | G06N 5/00 |
| 2019/0132264 A1* | 5/2019 | Jafar Ali | G06F 17/279 |

\* cited by examiner

Chatbot Builder ⚠ You can't edit an active bot. ← Back | ? Help

Food Company Bot [New] | ⚙MANAGE ✉DIALOGS ⊞ENTITIES | Preview | Train Bot | Deactivate Dialogs — 16 items

| Order Status | □ Show in Footer Menu </> Save |
| ACTIONS INTENT ~610 | |

Preview
Snap-In Channel:
Food App Deployment ▾ | Submit

Customer Inputs ✥×

Enter at least five

[ Where's my order ]

check my order status ⊠
check order status ⊠
I want to know my order status ⊠
check status of my order ⊠
where is my order ⊠
I have not received my order ⊠
it's been too long ! ⊠
where is my food ? ⊠
is my food on it's way? ⊠

Next Step ○Ask "Anything else?" ○Go to... ●Show menu

Search...
Add an Item
User Verification
Select different Order
Unknown Error
Order Status Check
Cancel Order
Order Status
Select Order ⌐ 620
✕ Food Company Bot ▾

Here are some things I can do for you :

| Order Status |
| Update Order |
| Cancel Order |
| Transfer To Agent |
| Reset Password |

2:17 PM

Type your message ...

INTENT INTERPRETER FOR A VISUAL BOT BUILDER

CROSS REFERENCE TO RELATED APPLICATIONS

This application claims the benefit of U.S. Provisional Patent Application 62/581,550, by Krishnan, et al., "Visual Bot Builder," filed Nov. 3, 2017; this application is related to U.S. Pat. No. 10,968,581, by Krishnan, et al., "Dialog Reuse for a Visual Bot Builder," filed herewith, both of which are hereby incorporated by reference in their entireties.

BACKGROUND

A chat bot is a computer program that conducts a conversation with a user and is designed to simulate a human conversational pattern. Designing chat bots often involves using text editors which makes the configuration and design process burdensome for the developer. Improved interfaces for the design, configuration, and testing of chat bots are therefore desired.

BRIEF DESCRIPTION OF THE DRAWINGS

The accompanying drawings are incorporated herein and form a part of the specification.

FIG. 3 illustrates another example usage of a bot-builder interface for configuring a dialog, according to an embodiment.

FIGS. 6A and 6B illustrate examples of managing intents using a bot-builder interface, according to example embodiments.

In the drawings, like reference numbers generally indicate identical or similar elements. Additionally, generally, the left-most digit(s) of a reference number identities the drawing in which the reference number first appears.

DETAILED DESCRIPTION

A chat bot executing on a computing device is typically designed to operate as a conversational agent with one or more users. For example, a chat bot executing on a computing device (hereinafter simply "chat bot" or "bot") may be configured to simulate a conversation a user may otherwise have with a human user via text or auditory methods.

An example use of a chat bot may be to provide customer service to users via the Internet or a mobile application. Chat bots may provide both greater convenience for users and lower costs for an organization (relative to having a live person interact with the user and handle the requests). For example, a user may visit or log into a website and have customer service requests fulfilled by a chat bot. In an embodiment, a multi-processing computing system, such as a server, may operate as a chat bot and may simultaneously interact with multiple users over a network.

A chat bot may be configured to execute dialogs in response to user input and user requests. A dialog may be a script, code, program, or other functionality designed to achieve a particular outcome or provide a particular type of customer assistance. The user requests that a chat bot is configured to handle (by executing dialogs) may include the most common service requests, such as validating a user, making purchases, requesting status updates, processing refunds, or modifying information. In other embodiments, other types of less common service requests may also be handled by a chat bot.

In an embodiment, a chat bot may be configured to interact and interface with customers or consumers who are looking for answers to frequently asked questions. Some of these questions may include "how do I get a refund?" "what is my order status?" "how do I cancel my order?" "What is your return policy?" "What is the cheapest flight to Europe?" The chat bot may serve as an interface between the customer and one or more backend databases or other information processing systems. In an embodiment, a chat bot may be used in conjunction with a live person. For example, if the chat bot is unable to fulfill a customer request, the customer may be transferred to a live person for assistance.

The chat bot may respond to customer input by retrieving and providing the requested information, requesting additional input or information from the user, or performing an action and providing the user with status updates about the progress of the action. This back-and-forth interaction between a user and chat bot may be referred to as a conversation. During the course of a conversation, a chat bot may call or execute multiple different dialogs. The bot-builder interface described herein provides a visual approach to configuring bots, enabling dialog reuse, and interpreting user input and other commands.

Figure 1:
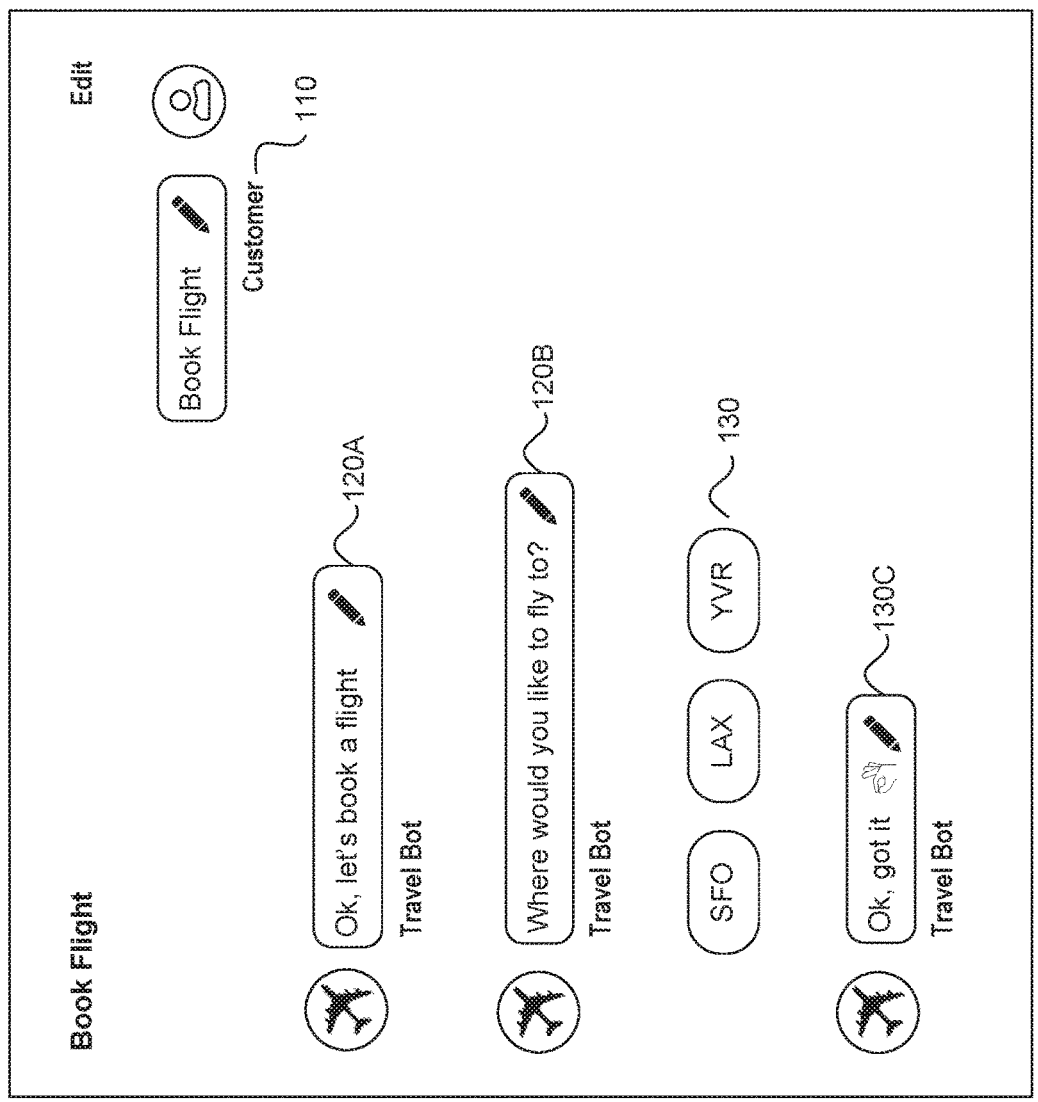
FIG. 1 illustrates an example conversation of an execution of a book flight dialog between a chat bot and a user, according to an embodiment.

FIG. 1 illustrates an example conversation 100 of an execution of a book flight dialog between a chat bot and a user, according to an embodiment. In the conversation 100, a user or customer is requesting to book a flight via a chat bot.

An interaction with a bot may begin with the bot executing a welcome dialog that includes a basic greeting from the bot such as "Hello, how may I help you today?" From there, depending on how the user answers, different dialogs, programs, or other sub-routines may be called by the bot to interact with the user.

Receiving the book flight command, the chat bot may execute a book flight dialog. In its execution, the chat bot may respond by acknowledging the customer's request to book a flight 120A, and may begin requesting additional information 120B. The book flight dialog may cause the chat bot to request information necessary to book the flight, such as locations, dates of travel, seat preferences, and credit card information, and then processes the request to book the flight.

In providing a response to the bot inquiry, the user may select one of the provided options for a destination 130 (e.g., by clicking on a button), and the chat bot may confirm the selection 130C. The chat bot may continue executing the book flight dialog until the user books a flight or cancels the request.

Dialogs, such as the book flight dialog, may be reusable objects. For example, two different users may be accessing a website or mobile application to book flights simultaneously. To service the users, a chat bot server may execute the book flight dialog for both users in parallel. In another embodiment, two different chat bots on two different travel websites may call or use the same book flight dialog, which may operate against different backend systems (e.g., corresponding to each respective travel website).

Figure 2:
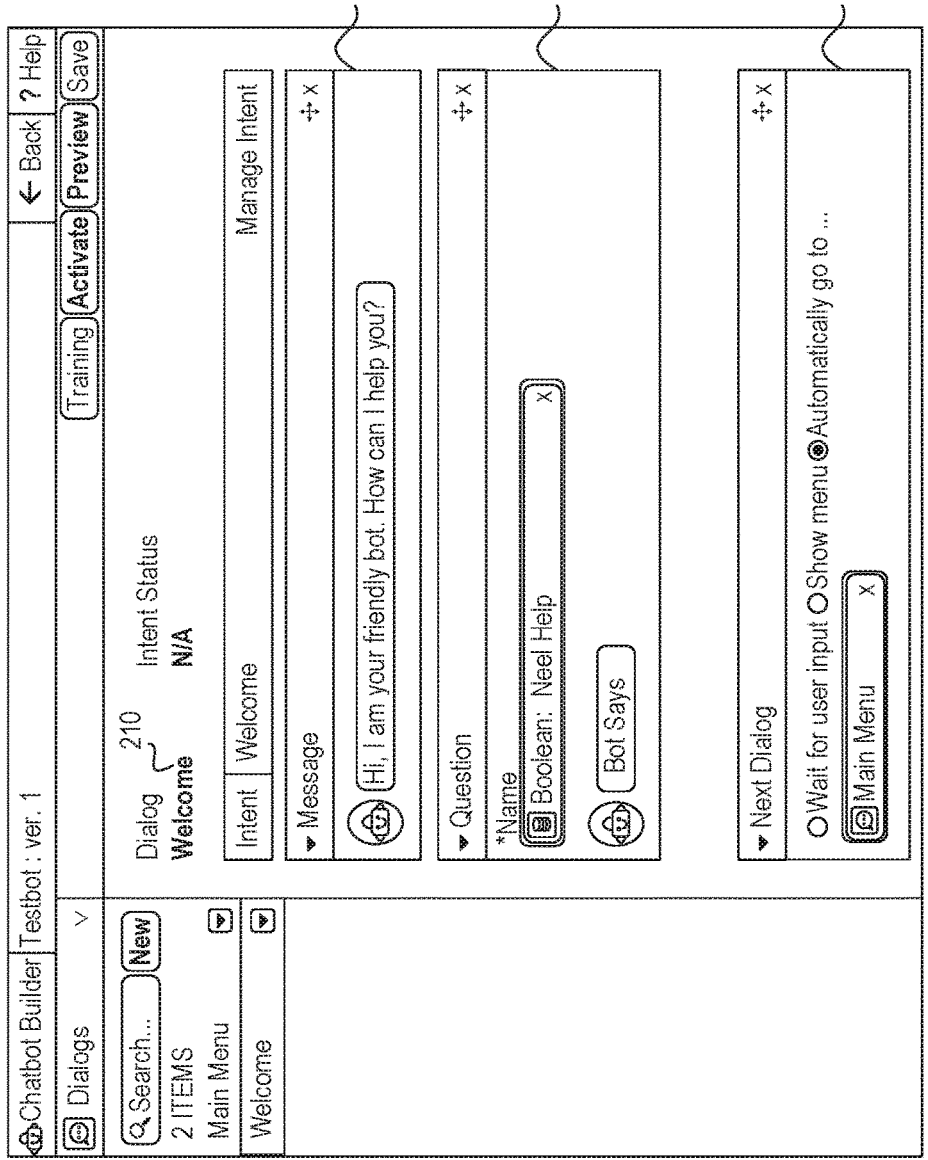
FIG. 2 illustrates an example usage of a bot-builder interface for configuring a dialog, according to an embodiment.

FIG. 2 illustrates an example usage of a bot-builder interface 200 for configuring a dialog 210, according to an embodiment. In an embodiment, a developer may visually construct and configure dialogs using a bot-builder interface 200. The bot-builder interface, described herein, may be a computing device that enables the dialog reuse through the visual construction and configuration of dialogs and conversations.

Welcome dialog 210 may be executed when a user first logs into a system, visits a website, or requests help. Using bot-builder interface 200, a developer may configure a welcome message 220 that the bot provides to the user as part of welcome dialog 210.

If the user responds with text indicating that user needs help, as shown in 230, the developer, using bot-builder interface 200, may configure how the bot would respond to the message. For example, the bot may respond by displaying a message, or by calling another function or dialog. Example bot responses, as shown in 240, may include waiting for user input, showing a menu of options, or calling another dialog (e.g., such as a main menu dialog).

Figure 3:
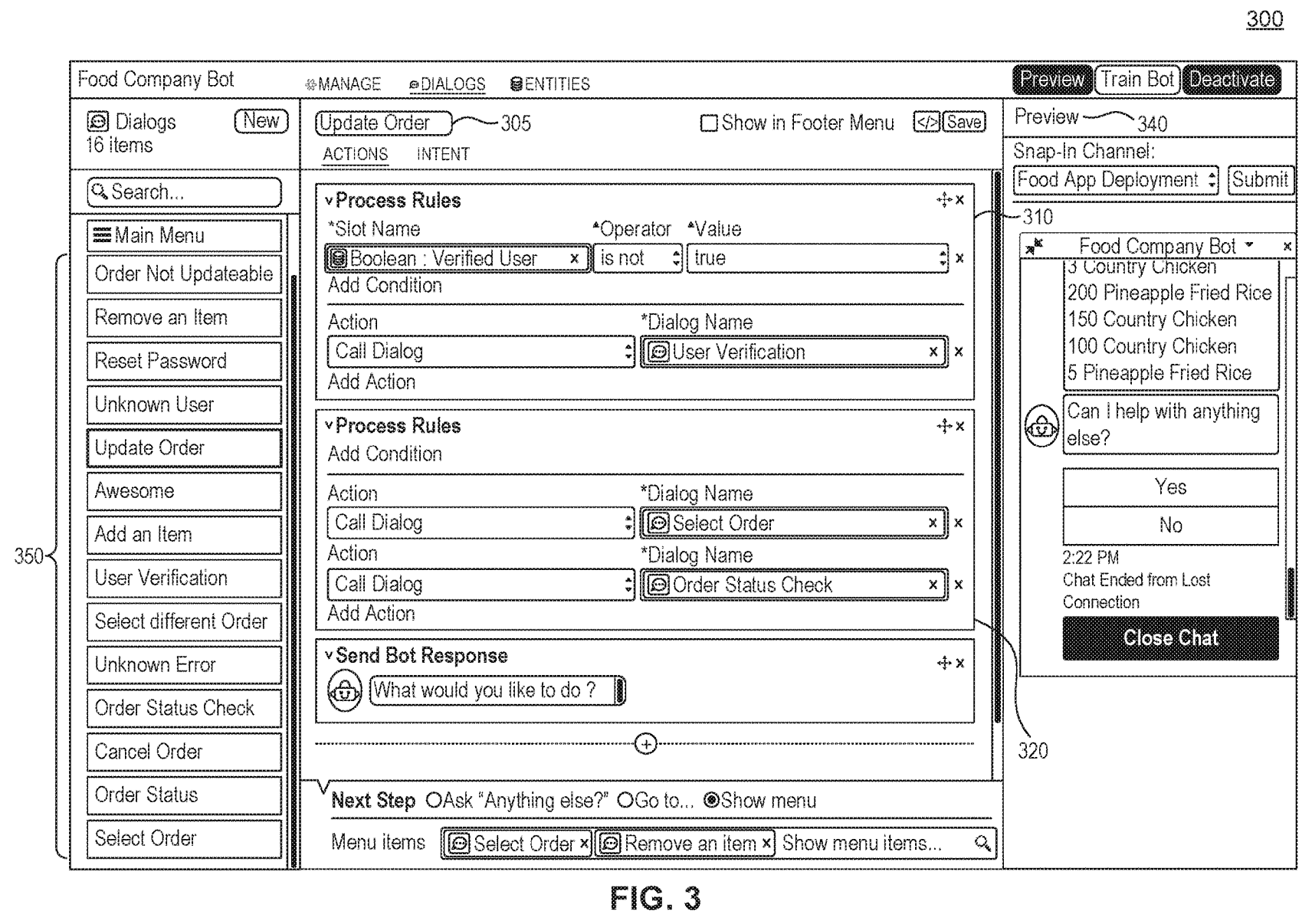

FIG. 3 illustrates another example usage of a bot-builder interface 300 for configuring a dialog 305, according to an embodiment. The example dialog 305 may be designed to enable a user to update their order. Bot-builder interface 300 illustrates example functionality with which a developer can configure dialog 305 to enable the user to update an order.

Through executing dialogs, a chat bot can provide the user with information retrieved from another system, request information from the user, and perform actions to fulfill user requests (such as account transfers, refunds, processing payments, booking tickets, etc.). Based on different user responses, the bot-builder interface 300 may enable a developer to cause the chat bot to call and execute different dialogs (conversational flows or interactions with the user). Bot-builder interface 300 may enable a developer to visually design the conversational flow based on different user responses.

Using bot-builder interface 300, a developer may select a 'call dialog' function that enables dialog reuse without the need to copy the code from the dialog being called. This may both speed up execution of the chat bot and simplify the development of conversational flows through enabling visual dialog reuse within a particular system.

Reusing dialogs may be difficult to perform in other tools. For example, using a text-only bot builder, dialog re-use may require copying and pasting the code of a particular dialog in multiple different places. Copying and pasting code may consume more memory, require additional computing cycles and other resources for compilation, and may make performing code updates more difficult. For example, a particular update may be required to be performed in multiple different places and then that code may need to be re-compiled in each location prior to execution.

For example, rather copying the code of a dialog in multiple locations, bot-builder interface 300 makes a call to a pre-configured dialog. Rather than requiring updates in multiple code locations, bot-builder interface 300 enables a developer to update the dialog configuration in only one location. Then, for example, any calling dialog will automatically receive the update without separate updates, debugging, or compiling being necessary, thus saving time and computing resources.

Rather than drawing lines back and forth between different dialogs as may be done in other builders, bot-builder interface 300 enables a developer to select a call dialog function as a response to user input. Then in a linear fashion, the developer may select which dialog(s) are to be executed in response to the user intent or response. All of this information may be contained in a single visual dialog. The user verification dialog as being called from the update order dialog 305 illustrates one example of this.

In an embodiment, the bot-builder interface system 300 may enable the developer to select from a drop down or list of previously created dialogs which to call or execute. Menu 350 illustrates a list of previously configured dialogs which may be available to be called or reused. Alternatively, bot-builder interface 300 may enable the developer to name and configure a new dialog.

Process rules sections 310 and 320 of bot-builder interface 300 may enable a developer to define the functionality of dialog 305. In process rules section 310 a developer may determine a particular user state. For example, prior to allowing a user to update an order, bot-builder interface 300 may enable the developer to determine whether or not the user has been verified. "Boolean: Verified User" may call or reuse another preconfigured dialog that may determine whether or not the user has logged in, or may otherwise confirm or verify the user identity.

In an embodiment, the user verification dialog may ask the user for particular information: email address, password, username, address, answers to security questions, pin number, order number, ticket number, or other information by which the system or bot can verify the user's identity and/or retrieve information about the user's account. Verification may be required to perform or process various requests including providing the user account balance information, performing transfer requests, or purchasing items. In an embodiment, if the user is unable to be verified, the user may be transferred to another chat with a live person or called on the telephone by a live associate to help the user.

Verifying the identity of a user may be a commonly used dialog, in which the same process is repeated over and over again across different users by the same bot, by different bots, or may be called by multiple different dialogs. In an embodiment, the identity of a user may be verified after or as part of the welcome dialog. Or, for example, the user identity may be verified after the user requests to perform a particular action (such as check my order status), for which account information or authentication is required. The bot-builder interface 300 enables a developer to quickly and easily determine when and where to reuse a dialog without copying, pasting, or recompiling the code of the dialog.

Bot-builder interface 300 enables a developer to make calls to different dialogs without leaving a calling dialog. For example, using bot-builder interface 300, the developer can instruct to bot to execute the User Verification dialog. Then, for example, in executing, upon completion of the User Verification dialog, the bot may save the state of processing and return to the originating dialog (without an explicit developer instruction to return). Or, for example, processing may be transferred to another dialog as part of the User Verification dialog. The bot-builder interface 300 makes designing this flow intuitive, easy, and visual for the developer.

Once the user has been verified in process rules section 310, bot execution may continue to the next process rules section 320 of dialog 305. In section 320, the developer may call a select order dialog which enables the verified user to select from whatever user orders are available to the user to update. In an embodiment, the orders may be retrieved from a database or other order tracking system.

In an embodiment, the bot-builder interface system 300, supporting the chat bot, may maintain a state of each dialog or user session. For example, if the chat bot goes from a first booking ticket dialog (where the user has reserved a ticket but not clicked "purchase") and then goes to check their account status from a second status dialog, if the user returns to booking ticket dialog, the bot may resume right where the user left off, with the previous ticket. Then by simply selecting "purchase," the action may be completed. Or a verified user may be verified across the system regardless of what action they are performing. In an embodiment, the chat builder interface may enable a developer to determine whether or not the state of the particular dialog is to be preserved upon a subsequent return to the same dialog by the same user in this or a future session.

In an embodiment, bot-builder interface 300 may include a preview section 340 that enables a developer to see how a conversational flow or interaction would appear from a user's point of view. For example, as the conversational flow is being designed, the system 300 may simulate a user interaction as shown in the 'food company bot' preview box. The developer may then interact with the bot as the user. In a text-based hot builder, it may not be possible to visually display the user responses or information on the same screen as the bot responses. The visual display of the bot-builder interface and the preview 340 simplifies the bot building process for the developer, and enables a more smooth conversational flow.

Bot-builder interface 300 enables a developer to quickly and easily select how to receive responses and other input from a user. For example, the developer may provide input via menu selections, text input, and/or voice input. The bot-builder interface 300 enables a developer to visually create the conversational flow from the bot's point of view and have a real-time immediate preview of the flow from the user's perspective. The bot-builder interface 300 enables calls back-and-forth between different dialogs simplifying the dialog creation process.

Figure 4A:
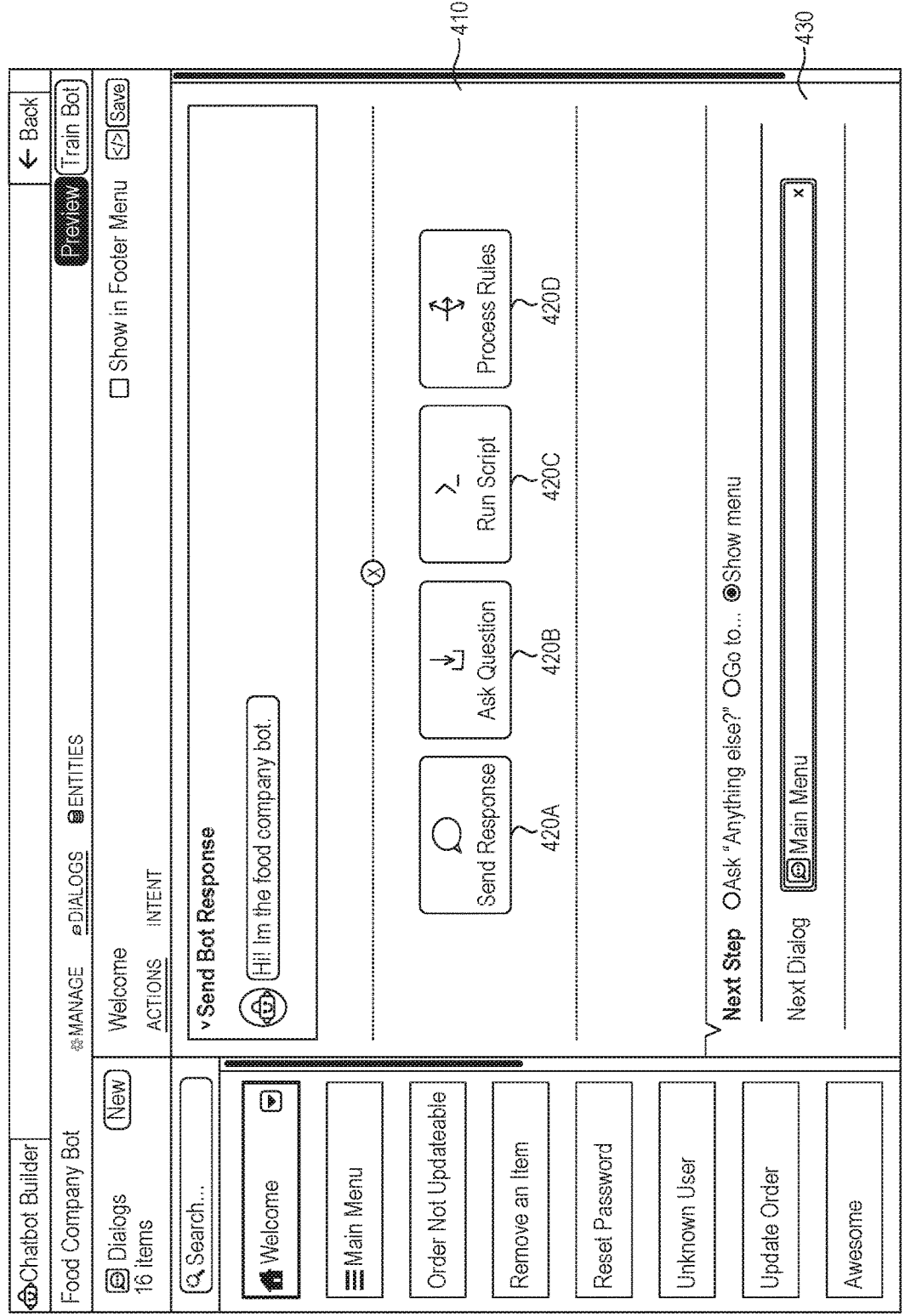
FIGS. 4A and 4B illustrate example usages of a bot-builder interface to configure a welcome dialog, according to an example embodiment.
Figure 4B:
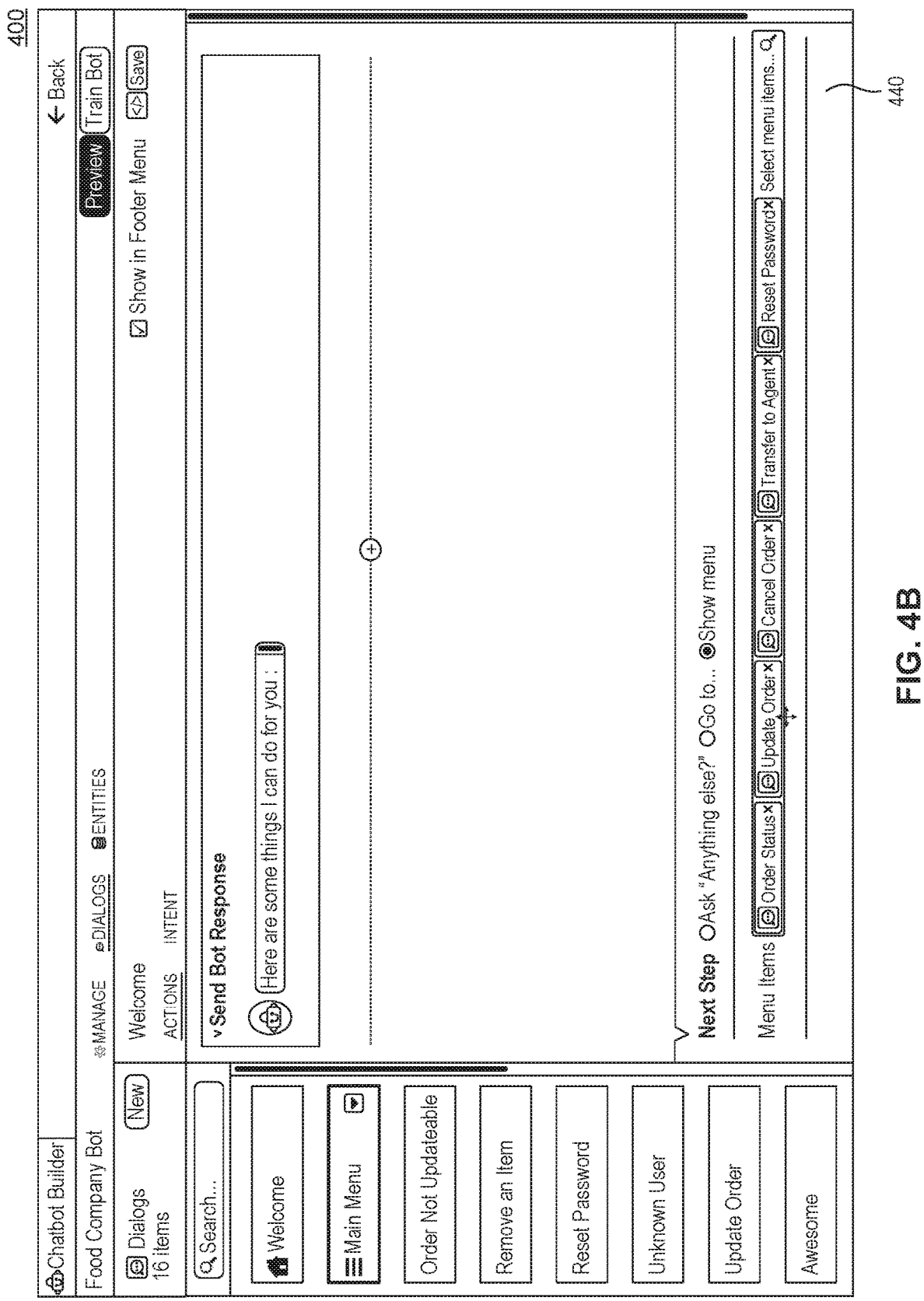

FIGS. 4A and 4B illustrate example usages of a bot-builder interface 400 to configure a welcome dialog, according to an example embodiment, The dialog may be configured to present welcome text, "Hi! I'm the food company bot." After the welcome text, in section 410, bot-builder interface 400 enables a developer to select which function 320 the bot should execute as part of the dialog.

Example functions include sending a response 420A, such as presenting text or information to the user. The function may include asking a question to request information from a user 420B. Asking a question may include displaying a text box, radio-button, or drop-down selection area which the user may use to respond to the question.

The function may include running a script 420C or free code entered by the developer. Or the function may include defining process rules 420D (as described above with respect to FIG. 3), which may include calling another dialog. As shown in section 430, the developer may define what happens at the end of the execution of the Welcome dialog as well. In an embodiment, the bot may call or execute the Main Menu dialog, as selected by the developer in the bot-builder interface 400. The calling of the Main Menu dialog may occur after or in lieu of one of the functions 420.

FIG. 4B illustrates an example of configuring the main menu dialog using the bot-builder interface 400 as it was called from the welcome dialog. As can be seen in section 440, the developer can provide the user a selection of different menu options. The example menu options may include: order status, update order, cancel order, transfer to agent, and reset password. The example shown includes an additional search box so the user may search for additional menu items. The selected options may be displayed in a menu for a user to select.

Alternatively or additionally, the bot-builder interface 400 may enable the developer to allow the user to type in text, key words, questions, or commands, which may be evaluated and the corresponding dialog may be loaded and executed by the bot. The bot-builder interface 400 may enable the developer to visually configure how the bot responds to different user input, by performing different actions, requesting information, or calling various dialogs.

Figure 5:
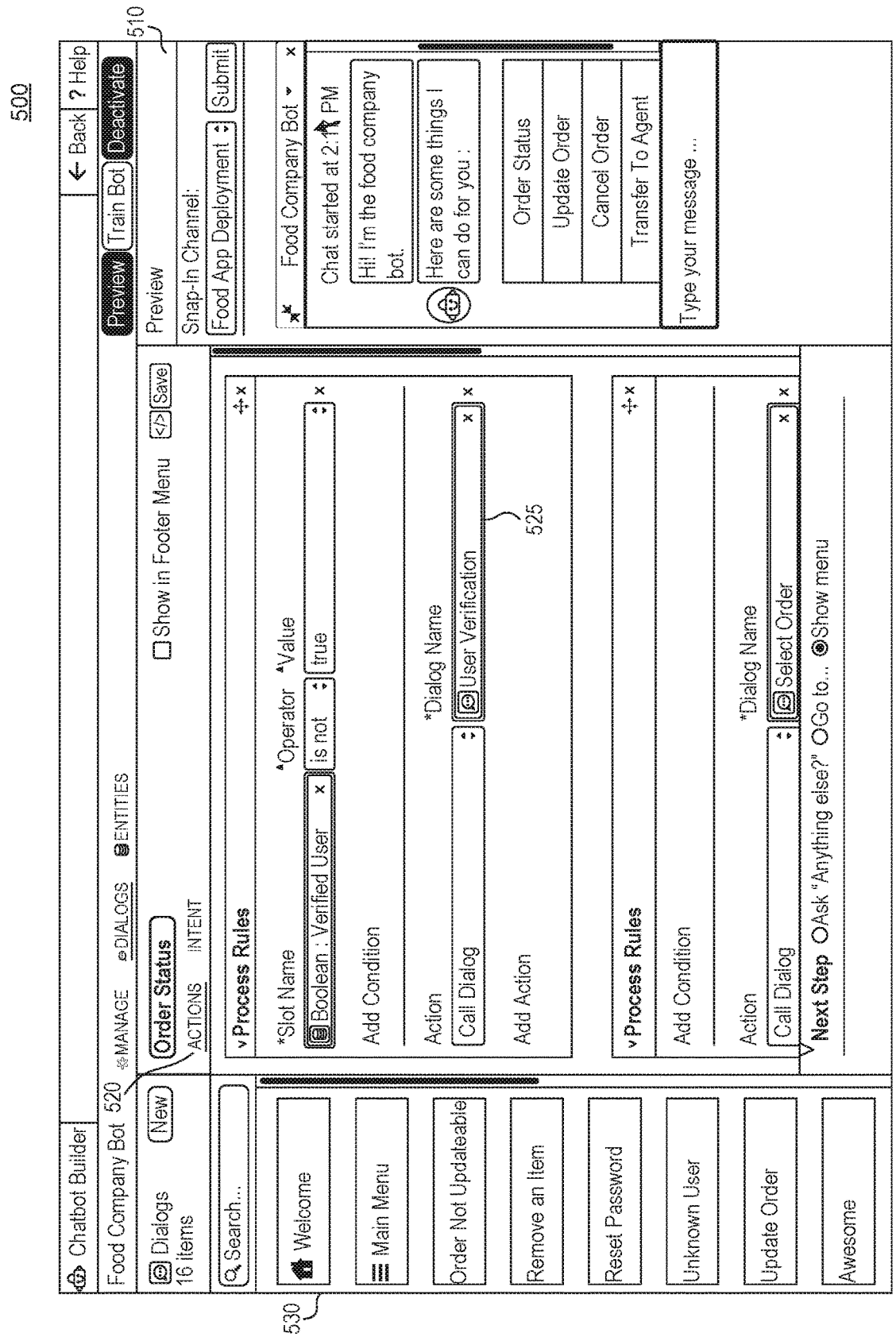
FIG. 5 illustrates an example bot-builder interface, according to another example embodiment.

FIG. 5 illustrates an example bot-builder interface 500, according to another example embodiment. Preview pane 510 illustrates a preview of a simulated customer experience that may be updated as the actions 520 are updated by a developer.

As shown in menu pane 530, the food company bot may first execute a welcome dialog which may call a main menu dialog. The sequence of how may appear to a customer as part of a conversational flow is shown in preview 510. The user may select an option by mouse clicking on, or touching on a touchscreen interface, or by typing in an entry from the menu. Rather than selecting a menu option, the user may also speak or type a question, message or command, in the box that reads "Type your message . . . "

Bot-builder interface 500 may process the developer configurations of the dialog 520 against simulated input from preview 510 in real-time. This may enable the developer to visually test and see the user experience with the bot (through example conversations with a simulated user) without leaving the design or bot-builder interface 500.

Bot-builder interface 500 enables a developer to build and reuse dialogs so that reused dialogs do not need to be copied-and-pasted and strung together into a single long execution. Instead, bot-builder interface 500 enables a developer to select a dialog to execute with a "call" action or function within the interface. The user verification dialog 525 illustrates an example of this. Using calls to dialogs reduces the overall length of code that must be stored (relative to copying and pasting code over and over again) and reduces the time and resources necessary to debug, update, compile, and execute the dialogs.

By not stringing the code of each dialog together into one long execution, and instead providing different dialog calls or references, the bot-builder interface 500 enables simple dialog reuse and update. For example, if a change is made a particular dialog, the change is automatically propagated to any other calling dialogs or bots without requiring the developer or other developer to copy and paste the code over and over again, which also eliminates the need to debug and compile the calling dialogs, thus saving computing resources. Furthermore, these changes may be seen and tested in the preview pane 510.

In an embodiment, a dialog may be used (and reused) by multiple different bots which may be customized for different customer or user experiences. For example, the user verification dialog 525 may be used across different systems that need to verify a user. While the core functionality of the verification may remain the same, the dialog may be configured to connect to different databases, but request the same information from users (e.g., e-mail address or username, and password). Or for example, a general verification dialog 525 may be created, and then an administrator or developer may visually select which information to request from a user (email or username, password or pin, security questions, etc.) as part of the verification process.

Figure 6B:
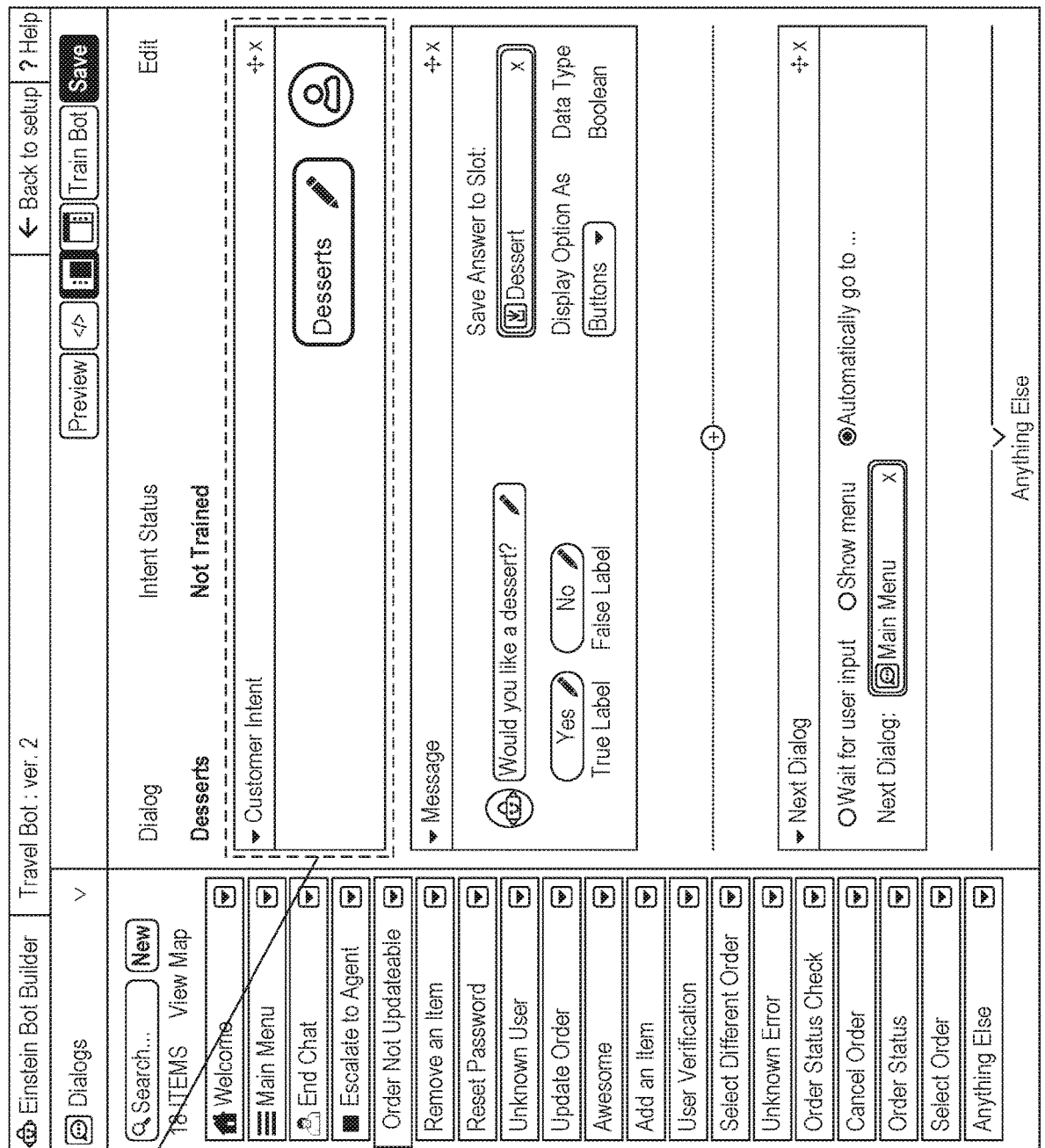

FIGS. 6A and 6B illustrate examples of managing intents using a bot-builder interface, according to example embodiments. People often communicate similar ideas differently. For example, different users may have different ways by which to request the status of an order. Bot-builder interface 600 allows a developer to account for the various ways in which a bot may determine that a user is requesting an order status lookup, by defining customer intents 610. Section 610 illustrates various terms that may be received from a user that may be interpreted as an intent to retrieve or request the status of an order.

The intent section 610 of the bot-builder interface 600 may indicate the various ways in which a user or customer may trigger the execution of the dialog. The example intent 610 shows various phrases the user can enter that may be interpreted as communicating an intent or desire to check on an order status, which in turn may trigger an execution of the order status dialog.

Bot-builder interface 600 may train (or enable a developer to train) the bot to identify different keywords or phrases that may be used to trigger an execution of the particular dialog. By providing an intent definition section 610, bot-builder interface 600 may make the bot more responsive to a broader or narrower range of inputs or users. Example input that may trigger an execution of the order status dialog include: check my order status, where is my order, it's been too long, and where is my food. Or, for example, the order status dialog may be executed upon the detection of a menu selection of "Order Status" as shown in preview 620.

In an embodiment, bot-builder interface 600 may enable a developer to set a matching threshold by which a bot would not need to find all the words or letters in a user input to trigger a particular dialog. In an embodiment, a particular percentage of the letters or words may be enough to cause a trigger of the dialog. In an embodiment, missing or misspelled words may be still trigger the calling of a particular dialog. For example, phrases such as "Where order," or even an incorrect spelling such as "were ordeeer," may be close enough to trigger the dialog to determine the customer intent 610 of order status. For example, bot-builder interface 600 may receive a phrase from preview 620, determine a word is misspelled, and determine that since the input exceeds the matching threshold, the dialog should he triggered. In an embodiment, a natural language processing engine may be used to determine which dialog to invoke based on the user's input.

FIG. 6B illustrates another example of managing customer intents using a bot-builder interface 630. As referenced above, a user can type in any different number of responses or messages to convey the same intent. The bot-builder interface 630 allows a developer to visually configure, define, and manage a user's intent, by defining different keywords and phrases that launch a particular dialog. The developer may define what user responses will trigger dialog execution, or whether additional information or clarification may be required from the user.

The bot-builder interface 630 may confirm the user intent as a message. For example, the user may input "something sweet," "dessert," or "ice cream." Or, for example the user may mistype or misspell "dessert" and enter "desert" instead. And each of these may be interpreted as conveying the same intent, to which the bot may respond "Would you like a dessert?" If the user answers "yes," this may serve as confirmation that the appropriate dessert dialog should be launched.

Bot-builder interface system 630 may allow the develop to define multiple different phases that may be used to convey the same intent thus avoiding the need to configure a separate dialog for each of multiple strings of varying messages as directed to the same intent. Bot-builder interface 630 may allow the developer to build the conversational flow based on exact or inexact wording of a user either of which may trigger the execution or launch of a dialog and without copying-and-pasting the same dialog over and over again for each potential keyword trigger.

Bot-builder interface 630 enables a developer to visually interact with different user entries and/or intents. The power of visually seeing the user input or intent and the bot response enables for faster building and less processing resources (in the back and forth compiling and execution that may be required without the real-time preview).

Figure 7:
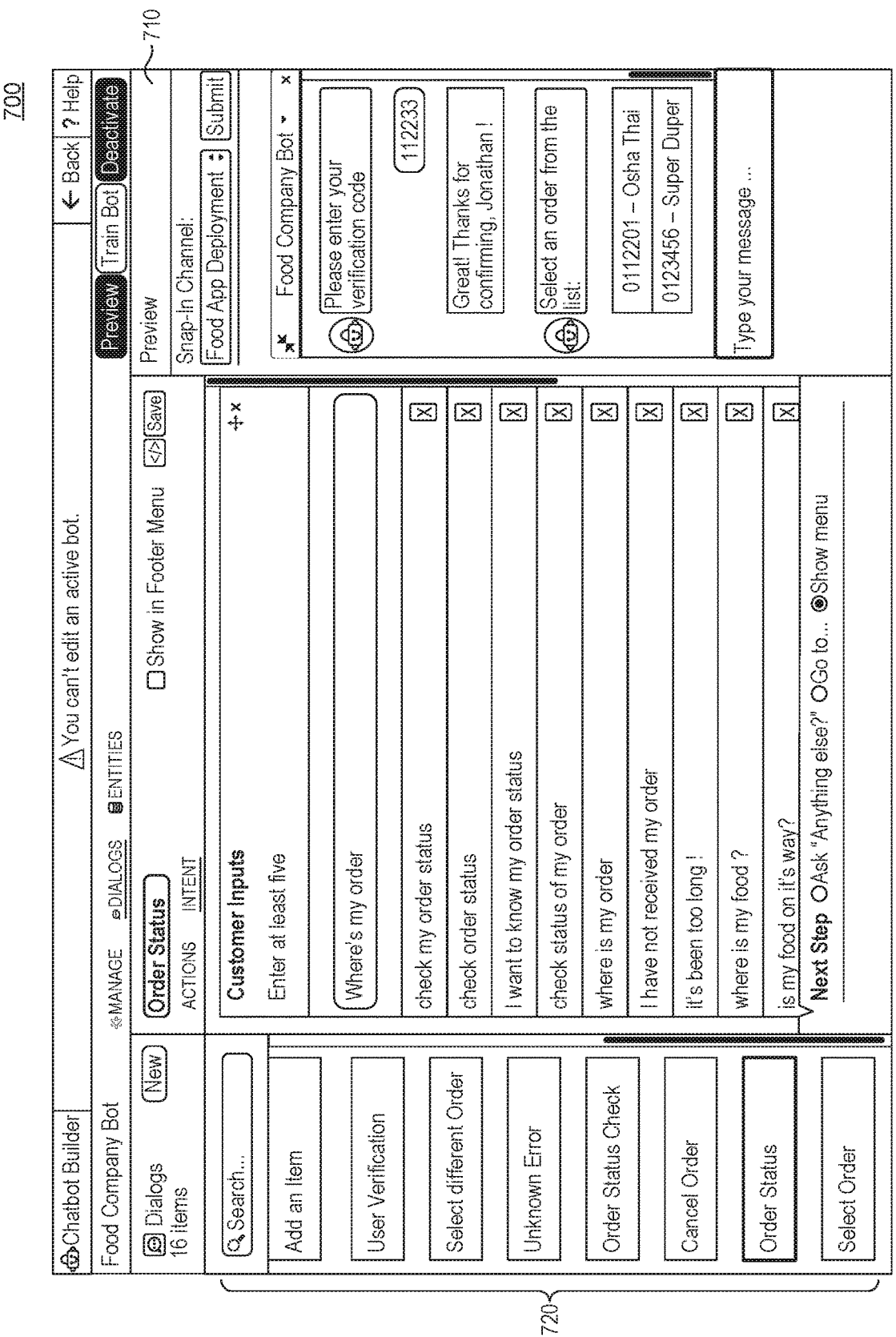
FIG. 7 illustrates an example bot-builder interface, according to another example embodiment.

FIG. 7 illustrates an example bot-builder interface 700, according to another example embodiment. As shown in preview section 710, a user may have multiple orders from which to choose, and may be prompted to select one of the listed orders from the menu (as designed via the bot-builder interface 700). The user may then be able to select the corresponding order number for which the user is requesting status information.

In an embodiment, bot-builder interface 700 may enable a developer to allow the user to type in an order number with an order request. For example, the user may type in "Where is order 112233?" Then, for example, the bot-builder interface 700 may enable the developer to design the conversation so that the order request dialog (displaying the menu of orders) is skipped, and instead the order status dialog may be called directly without first requesting the user to select from a menu of orders.

As shown in preview 710, bot-builder interface 700 enables a developer to design and preview or simulate, in real-time, a customer interaction with a bot (executing the dialog). The developer may visually call or reuse different dialogs, define various triggers or customer intents by which the dialogs are called, and walk through a simulated customer experience, with different user inputs and responses, all from within the bot-builder interface 700.

In an embodiment, a dialog may include a function or module that runs when a particular keyword or menu item is detected or triggered. A dialog may include including actions that are performed by the bot in response to user input. In an embodiment, a single conversation with a user may include calling multiple different dialogs. Dialogs may include a backend actions and do not have to be user facing. For example, a dialog may be designed to enable a user to change a password. The dialog may then direct the user or provide a link to a change password webpage where the user can change the password, and the dialog may indicate that the user has changed the password on the backend system.

Bot-builder interface 700 provides a list 720 of previously built or named dialogs. Bot-builder interface 700 however may also track sequences and back-and-forth interactions or call sequences between different dialogs which may be called or referenced in a conversational thread. The bot-builder interface 700 may visually display the tracked sequences of entry and exit dialogs for the developer so that the developer knows the context in which a particular dialog is being called.

Figure 8A:
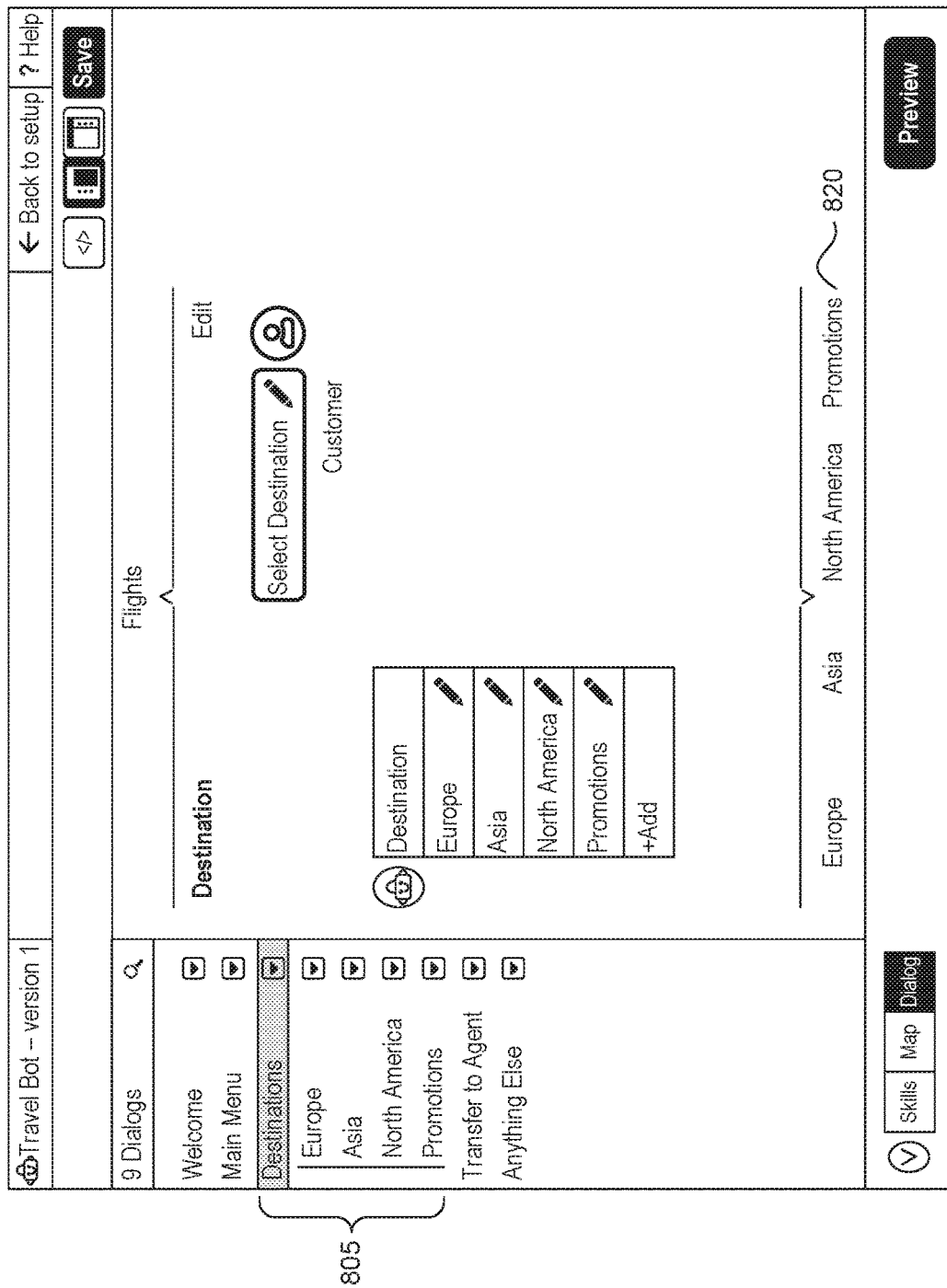
FIGS. 8A and 8B illustrate examples of configuring dialogs using a bot-builder interface, according to an embodiment.
Figure 8B:
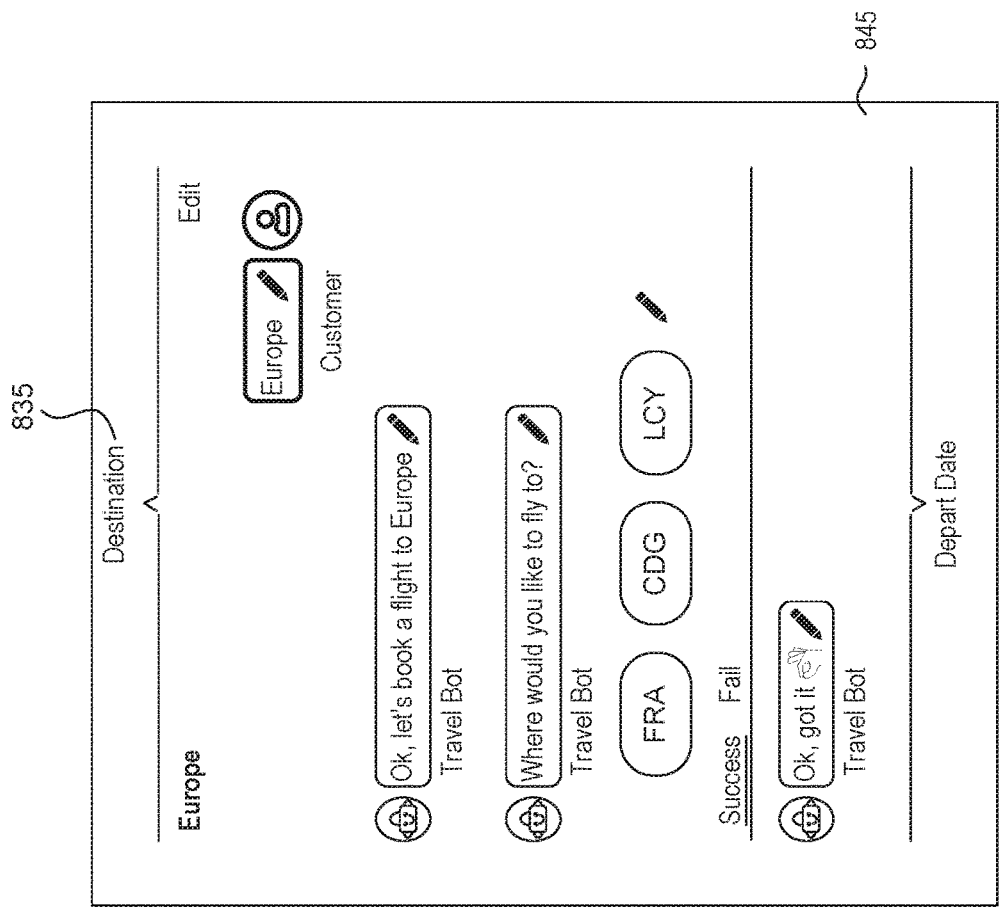

FIGS. 8A and 8B illustrate examples of configuring dialogs using a bot-builder interface 800, according to an embodiment. Bot-builder interface 800 may track a conversation with a user as a bot executes different dialogs responsive to the user input. The tracking may include recording which dialogs were called or executed in which order.

As shown in interface 800, the user may declare an intent to select a travel destination. In response to the user input, the bot may execute a select destination dialog that displays a menu of options to help the user select a travel destination. Each menu option may correspond to the execution of a different dialog.

In an embodiment, bot-builder interface 800 may automatically populate the menu items (of the destination dialog) through a connection to a backend database that includes the various or possible travel destinations or from a list of dialogs that are designated as being destination dialogs 805. The developer may then populate or construct a dialog corresponding to one or more of the destinations.

Section 820 includes a list of the various menu options. Section 820 indicates that based on the menu selection one of the Europe, Asia, North America, or Promotions dialogs will be executed next. Depending on which menu option the user or developer selects, a different dialog may be launched from the select destination dialog. Section 825 indicates that the Destination dialog was executed or called from the Flights dialog, thus providing context to where the current dialog fits within the conversational flow. For example, the user may have indicated an intent to book a flight, from which the destination dialog was called.

Bot-builder interface 800 may enable the developer to choose which menu options appear as part of the destination dialog menu. In an embodiment, the pencil marker may designate that the developer may modify the dialog or change the name of the dialog. For example, if the developer selects the pencil marker, bot-builder interface 800 may jump to the corresponding dialog as described below with respect to FIG. 8B.

FIG. 8B illustrates what happens if the user or developer selects the Europe dialog. As indicated in section 835, the launching dialog was the destination dialog (of FIG. 8A). As further indicated in section 845, the next dialog may be the departure date dialog. However, if the user changes their mind and does not want to select a European destination, they may be returned to destination dialog rather than transferred to the depart date dialog.

In an embodiment, the user may hop around between dialogs 835 and 845 and the bot-builder may maintain a state of what information the user or developer has entered and which information is missing and direct and guide the user accordingly until all the information has been received and the travel has been booked.

In an embodiment, when the Depart Date dialog launches, the entire panel may slide up and Europe may appear in section 835 as the launching dialog, while another dialog, such as Payment, takes the place of Depart dialog as the next dialog. The dialog flow sections 820, 825, 835, and 845 may automatically be maintained and displayed to assist the developer in knowing where within the conversational flow the dialog is being executed.

Figure 9:
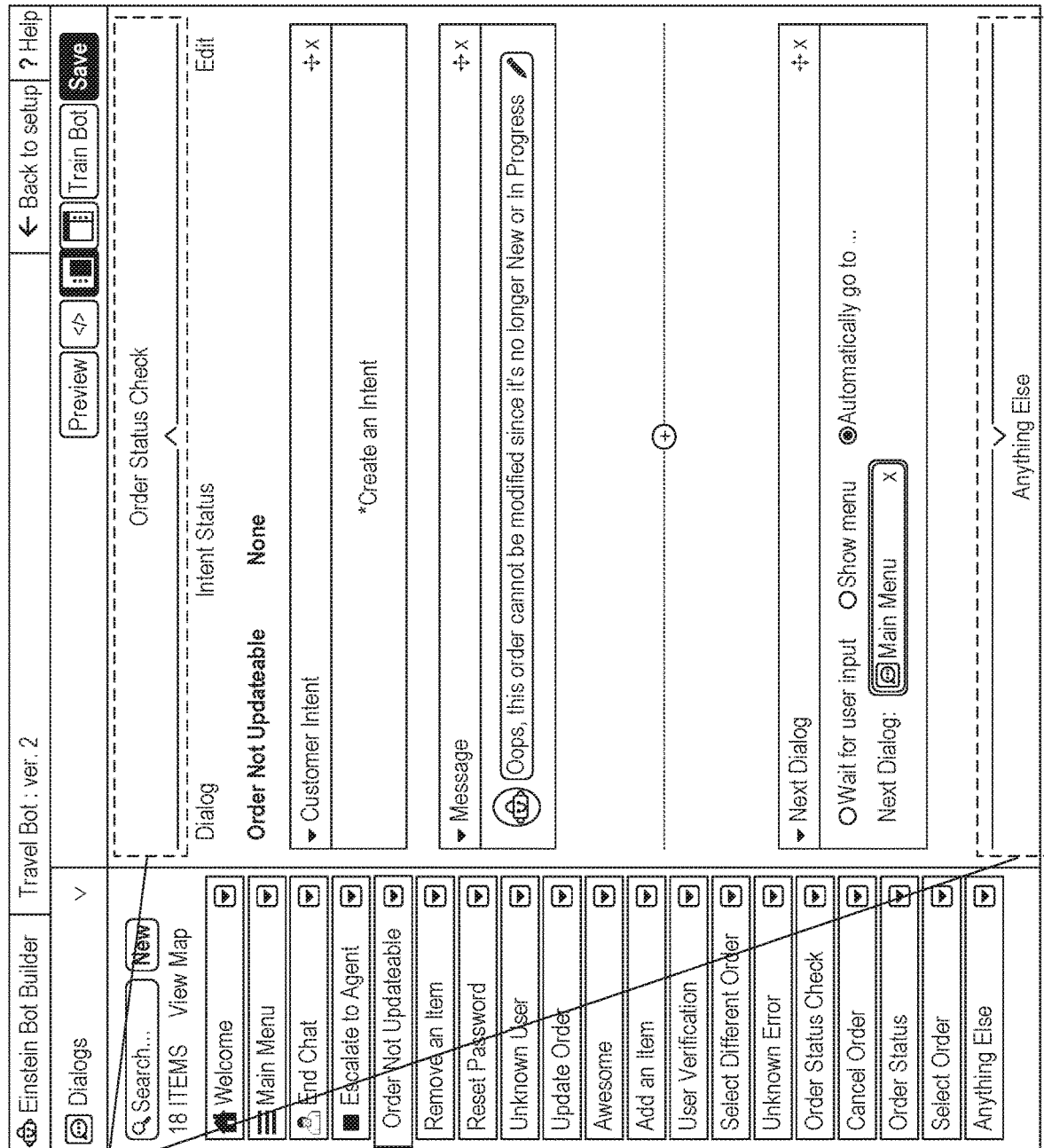
FIG. 9 illustrates an example of dynamic linking of entry and exit points from various dialogs using the bot-builder interface, according to an example embodiment.

FIG. 9 illustrates an example of dynamic linking of entry and exit points from various dialogs using the bot-builder interface 900, according to an example embodiment. As shown in dialog flow sections 820, 825, 835, and 845 of FIGS. 8A and 8B, a developer may define a conversational flow for a particular interaction, such as booking travel. This may help a user track their progress through a multi-step interaction.

Bot-builder interface 900 illustrates dynamic dialog linking 910 that enables a developer to create and manage the ordering of related dialogs that appear in the dialog flow sections. Some dialogs may not connect to or launch any subsequent dialogs, in which case execution may automatically return to the calling dialog. As shown, in bot-builder interface 900, the developer can select and automatically go to any of the linked dialogs pertaining to the conversational flow.

Figure 10:
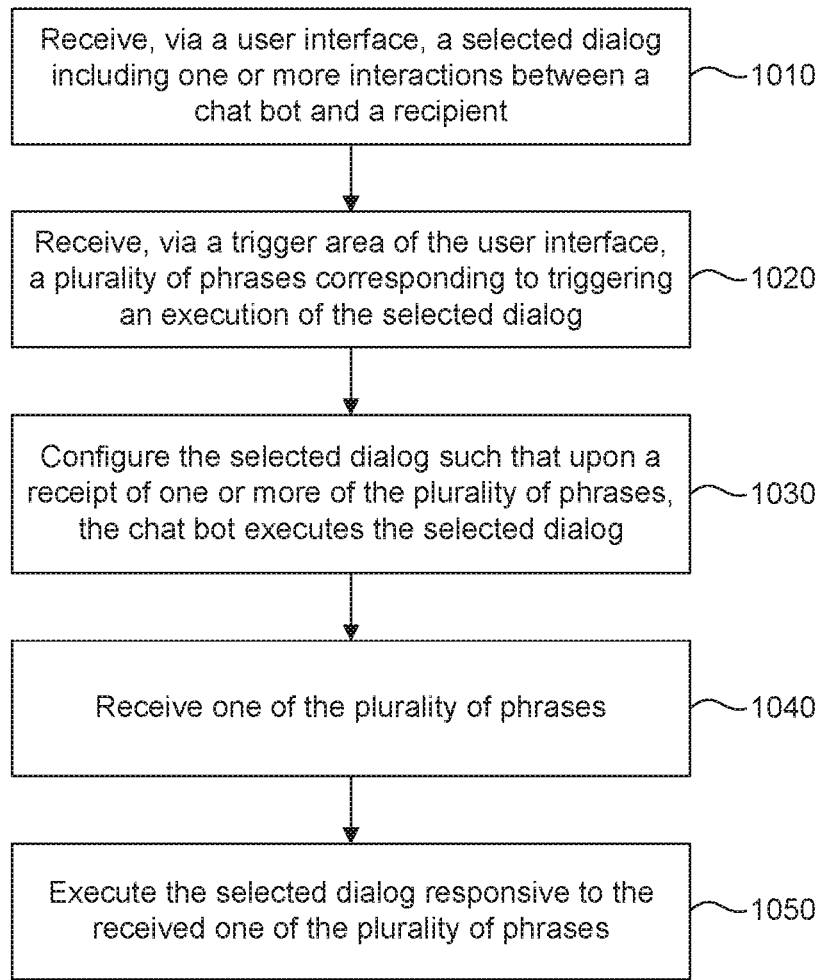
FIG. 10 is a flowchart for a method for message handling related to non-parallelizable functionality, according to an embodiment.

FIG. 10 is a flowchart for a method 1000 for message handling related to non-parallelizable functionality, according to an embodiment. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1000 shall be described with reference to the figures. However, method 1000 is not limited to the example embodiments.

In 1010, a selected dialog including one or more interactions between a chat bat and a recipient is received via user interface. For example, in FIG. 8A, a select destination dialog may be executed responsive to the select destination command. Also, a developer may launch to modify or execute of the listed dialogs from the menu, or add a new dialog.

In 1020, a plurality phrases corresponding to triggering an execution of the selected dialog are received via a trigger area of the user interface. For example, in FIG. 6A, the intent area 610 may correspond to a trigger area that includes different keywords and phrases that may be used to trigger an execution of the order status dialog. The intent area 610 includes phrases such as "where is my order" and "Where is my food?" that the developer can input, change and modify using the bot-builder interface 600.

In 1030, the selected dialog is configured such that upon a receipt of one or more of the plurality of phrases, the chat bot executes the dialog. For example, in FIG. 6A, the various phrases of the intent area 610 may be saved. Then, for example, during an execution, the chat bot may search or parse user input to identify any of these phrases. If the phrases are detected from user input, the chat bot may launch the corresponding dialog. In an embodiment, a natural language engine may parse the user input and determine whether one of the trigger words or phrases was received. The chat bot may then execute the corresponding dialog.

In 1040, one of the plurality of phrases is received. For example, in FIG. 1, a phrase "Book Flight," which may correspond to launching a book flight dialog is received. Or for example, in FIG. 6A, a keyword or phrase may be received via preview area 620. If the input matches any of the intent 610 phrases and/or exceeds a matching threshold, the dialog may be launched or executed.

In 1050, the selected dialog is executed responsive to the received one of the plurality of phrases. For example, in FIG. 8B, Europe dialog is launched or executed responsive to the user typing in "Europe" which may be a trigger word.

Figure 11:
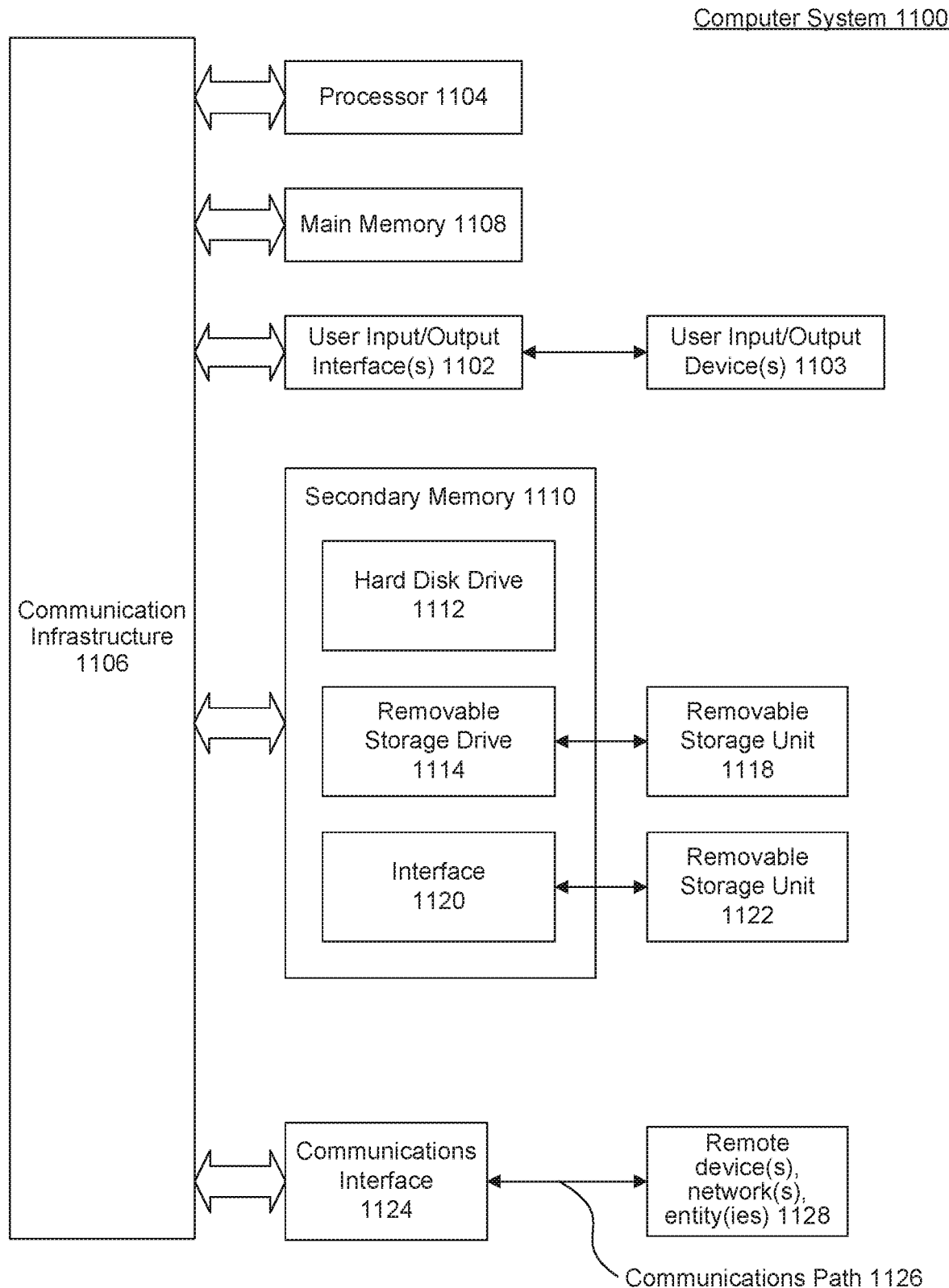
FIG. 11 is an example computer system useful for implementing various embodiments.

Various embodiments may be implemented, for example, using one or more well-known computer systems, such as computer system 1100 shown in FIG. 11, One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124, Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON). Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    receiving, via a user interface of a bot-builder development environment, a selected dialog including one or more interactions between a chat bot and a recipient;
    receiving, via a trigger area of the user interface, a plurality of phrases corresponding to triggering an execution of the selected dialog;
    configuring the selected dialog wherein upon a receipt of one of the plurality of phrases, the chat bot executes the selected dialog;
    receiving a threshold indicating a percentage of words for one of the plurality of phrases that trigger the execution within the bot-builder development environment;
    receiving the one of the plurality of phrases via a preview area of the user interface of the bot-builder development environment that is configured to simultaneously display the preview area with the trigger area within the bot-builder development environment, wherein the preview area displays a simulated interaction between the chat bot and a recipient; and
    executing functionality associated with the selected dialog responsive to the received one of the plurality of phrases based on a determination that the received one of the plurality of phrases exceeds the threshold.

2. The method of claim 1, wherein the receiving one of the plurality of phrases comprises:
    receiving input via a preview area of the user interface, wherein the chat bot is executing;
    determining that at least one of the words of the input is misspelled;
    comparing the input against the plurality of phrases; and
    determining that the input exceeds the percentage.

3. The method of claim 1, wherein the receiving one of the plurality of phrases comprises:
    receiving a selection from a menu displayed in a preview area of the user interface, wherein the selection corresponds to executing the selected dialog.

4. The method of claim 1, wherein the receiving one of the plurality of phrases comprises:
    requesting user input confirming the execution of the selected dialog prior to the execution.

5. The method of claim 4, wherein the requesting comprises:
    displaying, via the interface, a message that the received one phrase is interpreted as an intent to perform an action corresponding to executing the selected dialog.

6. The method of claim 4, wherein the executing comprises:
    executing the selected dialog after receiving the input confirming the execution.

7. The method of claim 1, wherein the executing comprises: executing the selected dialog responsive to the received one of the plurality of phrases in the bot-builder development environment without recompiling code of the selected dialog.

8. The method of claim 1, wherein the executing comprises: executing the functionality associated with the selected dialog based on the determination that the received one of the plurality of phrases exceeds the threshold in lieu of presenting a menu of options from which the user can select the functionality associated with the selected dialog.

9. A system, comprising:
    a memory; and
    at least one processor coupled to the memory and configured to:
    receive, via a user interface of a bot-builder development environment, a selected dialog including one or more interactions between a chat bot and a recipient;
    receive, via a trigger area of the user interface, a plurality of phrases corresponding to triggering an execution of the selected dialog;
    configure the selected dialog wherein upon a receipt of one of the plurality of phrases, the chat bot executes the selected dialog;
    receive a threshold indicating a percentage of words for one of the plurality of phrases that trigger the execution within the bot-builder development environment;
    receive the one of the plurality of phrases via a preview area of the user interface of the bot-builder development environment that is configured to simultaneously display the preview area with the trigger area within the bot-builder development environment, wherein the preview area displays a simulated interaction between the chat bot and a recipient;

execute functionality associated with the selected dialog responsive to the received one of the plurality of phrases based on a determination that the received one of the plurality of phrases exceeds the threshold.

10. The system of claim 9, wherein the processor that receives one of the plurality of phrases is further configured to:
receive input via a preview area of the user interface, wherein the chat bot is executing;
determining determine that at least one of the words of the input is misspelled;
compare the input against the plurality of phrases; and
determine that the input exceeds the percentage.

11. The system of claim 9, wherein the processor that receives one of the plurality of phrases is further configured to:
receive a selection from a menu displayed in a preview area of the user interface, wherein the selection corresponds to executing the selected dialog.

12. The system of claim 9, wherein the processor that receives one of the plurality of phrases is further configured to: request user input confirming the execution of the selected dialog prior to the execution.

13. The system of claim 12, wherein the processor that executes is configured to: execute the selected dialog after receiving the input confirming the execution.

14. A non-transitory computer-readable device having instructions stored thereon that, when executed by at least one computing device, causes the at least one computing device to perform operations comprising:
receiving, via a user interface of a bot-builder development environment, a selected dialog including one or more interactions between a chat bot and a recipient;
receiving, via a trigger area of the user interface, a plurality of phrases corresponding to triggering an execution of the selected dialog;
configuring the selected dialog wherein upon a receipt of one of the plurality of phrases, the chat bot executes the selected dialog;
receiving a threshold indicating a percentage of words for one of the plurality of phrases that trigger the execution within the bot-builder development environment;
receiving the one of the plurality of phrases via a preview area of the user interface of the bot-builder development environment that is configured to simultaneously display the preview area with the trigger area within the bot-builder;
development environment, wherein the preview area displays a simulated interaction between the chat bot and a recipient; and
executing functionality associated with the selected dialog responsive to the received one of the plurality of phrases based on a determination that the received one of the plurality of phrases exceeds the threshold.

15. The device of claim 14, wherein the one computing device that receives one of the plurality of phrases is further configured to perform operations comprising:
receiving input via a preview area of the user interface, wherein the chat bot is executing;
determining that at least one of the words of the input is misspelled;
comparing the input against the plurality of phrases; and
determining that the input exceeds the percentage.

16. The device of claim 14, wherein the one computing device that receives one of the plurality of phrases is further configured to perform operations comprising:
requesting user input confirming the execution of the selected dialog prior to the execution.

17. The device of claim 14, wherein the one computing device that requests is further configured to perform operations comprising:
displaying, via the interface, a message that the received one phrase is interpreted as an intent to perform an action corresponding to executing the selected dialog; and
executing the selected dialog after receiving the input confirming the execution.

18. The device of claim 17, wherein the executing the selected dialog after receiving the input confirming the execution is performed in the preview area of the user interface.

* * * * *